(12) United States Patent
Kiyosawa (10) Patent No.: US 11,554,501 B2
(45) Date of Patent: Jan. 17, 2023

(54) ROBOT SYSTEM AND CONTROL METHOD

(71) Applicant: Seiko Epson Corporation, Tokyo (JP)

(72) Inventor: Yuki Kiyosawa, Shiojiri (JP)

(73) Assignee: SEIKO EPSON CORPORATION

( * ) Notice: Subject to any disclaimer, the term of this patent is extended or adjusted under 35 U.S.C. 154(b) by 177 days.

(21) Appl. No.: 17/001,743

(22) Filed: Aug. 25, 2020

(65) Prior Publication Data

US 2021/0060795 A1    Mar. 4, 2021

(30) Foreign Application Priority Data

Aug. 26, 2019   (JP) .............................. JP2019-153547

(51) Int. Cl.
*B25J 13/08*    (2006.01)
*B25J 9/16*    (2006.01)

(52) U.S. Cl.
CPC ........... *B25J 13/089* (2013.01); *B25J 9/1633* (2013.01); *B25J 9/1697* (2013.01)

(58) Field of Classification Search
CPC ....... B25J 13/089; B25J 9/1633; B25J 9/1697
See application file for complete search history.

(56) References Cited

U.S. PATENT DOCUMENTS

2017/0072566 A1 *   3/2017  Murata ................ G01B 11/026

FOREIGN PATENT DOCUMENTS

| JP | 2002-154080 A | 5/2002 |
| JP | 2013-198943 A | 10/2013 |
| WO | WO-2019107164 A1 * | 6/2019 ............... G05D 1/02 |

* cited by examiner

*Primary Examiner* — Jeff A Burke
*Assistant Examiner* — Hushmeen J Khan
(74) *Attorney, Agent, or Firm* — Harness, Dickey & Pierce, P.L.C.

(57) ABSTRACT

A robot system includes a base, a robot arm coupled to the base, a movement mechanism that moves the base, an input unit to which a target position of the base is input, a control unit that controls actuation of the movement mechanism based on the target position input to the input unit, a detection unit that detects a difference between a stop position of the base after the movement of the base by the movement mechanism is completed and the target position, and a memory unit that stores information on the difference detected by the detection unit. When the base is moved, the control unit sets a set target position where the base should stop according to the information already stored in the memory unit.

8 Claims, 9 Drawing Sheets

| TOTAL NUMBER OF TIMES OF MOVEMENT | START POSITION & TARGET POSITION | NUMBER OF TIME | Δx | Δy | Δθ | CORRECTION | MOVEMENT SUCCEEDED OR FAILED | AMOUNT OF CORRECTION Dx | AMOUNT OF CORRECTION Dy | AMOUNT OF CORRECTION Dθ |
|---|---|---|---|---|---|---|---|---|---|---|
| 1 | FROM A TO B | FIRST TIME | 45mm | 32mm | 12° | UNCORRECTED | SUCCEEDED | — | — | — |
| 2 | FROM B TO C | FIRST TIME | 25mm | 12mm | 15° | UNCORRECTED | SUCCEEDED | — | — | — |
| 3 | FROM C TO A | FIRST TIME | — | — | — | UNCORRECTED | FAILED | — | — | — |
| 4 | FROM A TO B | SECOND TIME | 37mm | 28mm | 12° | UNCORRECTED | SUCCEEDED | — | — | — |
| 5 | FROM B TO C | SECOND TIME | 22mm | 12mm | 15° | UNCORRECTED | SUCCEEDED | — | — | — |
| 6 | FROM C TO A | SECOND TIME | 22mm | 23mm | 9° | UNCORRECTED | SUCCEEDED | — | — | — |
| 7 | FROM A TO B | THIRD TIME | 47mm | 28mm | 12° | UNCORRECTED | SUCCEEDED | — | — | — |
| 8 | FROM B TO C | THIRD TIME | — | — | — | UNCORRECTED | FAILED | — | — | — |
| 9 | FROM C TO A | THIRD TIME | 41mm | 31mm | 6° | UNCORRECTED | SUCCEEDED | — | — | — |
| 10 | FROM A TO B | FOURTH TIME | 20mm | 29mm | 19° | UNCORRECTED | SUCCEEDED | — | — | — |
| | | | | | | | | | | |
| n | FROM A TO B | FIFTH TIME | 3mm | 7mm | 3° | CORRECTED | SUCCEEDED | 43mm | 30mm | 12° |
| ⋮ | ⋮ | ⋮ | ⋮ | ⋮ | ⋮ | ⋮ | ⋮ | ⋮ | ⋮ | ⋮ |

| TOTAL NUMBER OF TIMES OF MOVEMENT | START POSITION & TARGET POSITION | NUMBER OF TIME | Δx | Δy | Δθ | CORRECTION | MOVEMENT SUCCEEDED OR FAILED | AMOUNT OF CORRECTION Dx | AMOUNT OF CORRECTION Dy | AMOUNT OF CORRECTION Dθ |
|---|---|---|---|---|---|---|---|---|---|---|
| 1 | FROM A TO B | FIRST TIME | 45mm | 32mm | 12° | UNCORRECTED | SUCCEEDED | — | — | — |
| 2 | FROM B TO C | FIRST TIME | 25mm | 12mm | 15° | UNCORRECTED | SUCCEEDED | — | — | — |
| 3 | FROM C TO A | FIRST TIME | — | — | — | UNCORRECTED | FAILED | — | — | — |
| 4 | FROM A TO B | SECOND TIME | 37mm | 28mm | 12° | UNCORRECTED | SUCCEEDED | — | — | — |
| 5 | FROM B TO C | SECOND TIME | 22mm | 12mm | 15° | UNCORRECTED | SUCCEEDED | — | — | — |
| 6 | FROM C TO A | SECOND TIME | 22mm | 23mm | 9° | UNCORRECTED | SUCCEEDED | — | — | — |
| 7 | FROM A TO B | THIRD TIME | 47mm | 28mm | 12° | UNCORRECTED | SUCCEEDED | — | — | — |
| 8 | FROM B TO C | THIRD TIME | — | — | — | UNCORRECTED | FAILED | — | — | — |
| 9 | FROM C TO A | THIRD TIME | 41mm | 31mm | 6° | UNCORRECTED | SUCCEEDED | — | — | — |
| 10 | FROM A TO B | FOURTH TIME | 20mm | 29mm | 19° | UNCORRECTED | SUCCEEDED | — | — | — |
| ⋮ | | | | | | | | | | |
| n | FROM A TO B | FIFTH TIME | 3mm | 7mm | 3° | CORRECTED | SUCCEEDED | 43mm | 30mm | 12° |
| ⋮ | | | | | | | | | | |

FIG. 7

| TOTAL NUMBER OF TIMES OF MOVEMENT | START POSITION & TARGET POSITION | NUMBER OF TIME | Δx | Δy | Δθ | CORRECTION | MOVEMENT SUCCEEDED OR FAILED | AMOUNT OF CORRECTION Dx | AMOUNT OF CORRECTION Dy | AMOUNT OF CORRECTION Dθ |
|---|---|---|---|---|---|---|---|---|---|---|
| 1 | FROM A TO B | FIRST TIME | 45mm | 32mm | 12° | UNCORRECTED | SUCCEEDED | — | — | — |
| 2 | FROM B TO C | FIRST TIME | 25mm | 12mm | 15° | UNCORRECTED | SUCCEEDED | — | — | — |
| 3 | FROM C TO A | FIRST TIME | — | — | — | UNCORRECTED | FAILED | — | — | — |
| 4 | FROM A TO B | SECOND TIME | 37mm | 28mm | 12° | UNCORRECTED | SUCCEEDED | — | — | — |
| 5 | FROM B TO C | SECOND TIME | 22mm | 12mm | 15° | UNCORRECTED | SUCCEEDED | — | — | — |
| 6 | FROM C TO A | SECOND TIME | 22mm | 23mm | 9° | UNCORRECTED | SUCCEEDED | — | — | — |
| 7 | FROM A TO B | THIRD TIME | 47mm | 28mm | 12° | UNCORRECTED | SUCCEEDED | — | — | — |
| 8 | FROM B TO C | THIRD TIME | — | — | — | UNCORRECTED | FAILED | — | — | — |
| 9 | FROM C TO A | THIRD TIME | 41mm | 31mm | 6° | UNCORRECTED | SUCCEEDED | — | — | — |
| 10 | FROM A TO B | FOURTH TIME | 20mm | 29mm | 19° | UNCORRECTED | SUCCEEDED | — | — | — |
| n | FROM A TO B | FIFTH TIME | 3mm | 7mm | 3° | CORRECTED | SUCCEEDED | 43mm | 30mm | 12° |
| n + x | FROM A TO B | SIXTH TIME | 3mm | 6mm | 2° | CORRECTED | SUCCEEDED | 42mm | 29mm | 12° |
| n + y | FROM A TO B | SEVENTH TIME | 2mm | 5mm | 2° | CORRECTED | SUCCEEDED | 41mm | 28mm | 11° |
| n + y | FROM A TO B | EIGHTH TIME | 2mm | 4mm | 1° | CORRECTED | SUCCEEDED | 40mm | 27mm | 10° |
| ⋯ | ⋯ | ⋯ | ⋯ | ⋯ | ⋯ | ⋯ | ⋯ | ⋯ | ⋯ | ⋯ |

ROBOT SYSTEM AND CONTROL METHOD

The present application is based on, and claims priority from JP Application Serial Number 2019-153547, filed Aug. 26, 2019, the disclosure of which is hereby incorporated by reference herein in its entirety.

BACKGROUND

1. Technical Field

The present disclosure relates to a robot system and control method.

2. Related Art

Recently, in factories, due to labor cost rise and labor shortage, work manually performed in the past has been increasingly automated by various robots and robot peripherals. Further, recently, as shown in JP-A-2002-154080, wheeled automated guided vehicles with robots have autonomously moved and performed work at movement destinations.

The automated guided vehicle shown in JP-A-2002-154080 includes a robot arm, a movement mechanism that moves the robot arm, and an imaging unit. Further, a correction mark is provided on a transport station as a target position of the movement of the automated guided vehicle, and the automated guided vehicle images the correction mark at the movement destination and adjusts the position and posture based on the imaging result.

However, it is difficult for the wheeled automated guided vehicle as disclosed in JP-A-2002-154080 to make fine adjustment of the position after arriving at the target position. That is, to make fine adjustment of the position after once arriving at the target position, the fine adjustment may be impossible unless the vehicle takes a detour depending on circumstances. Alternatively, for example, when the detour is impossible due to an obstacle around, it is necessary for the vehicle to return to the start point and move again. As described above, accurate movement is necessary for the automated guided vehicle, however, in related art, there is no method for accurate movement.

SUMMARY

The present disclosure has been achieved to solve at least a part of the above described problem and can be realized as below.

A robot system according to an application example includes a base, a robot arm coupled to the base, a movement mechanism that moves the base, an input unit to which a target position of the base is input, a control unit that controls actuation of the movement mechanism based on the target position input to the input unit, a detection unit that detects a difference between a stop position of the base after the movement of the base by the movement mechanism is completed and the target position, and a memory unit that stores information on the difference detected by the detection unit. When the base is moved, the control unit sets a set target position where the base should stop according to the information already stored in the memory unit.

A control method according to an application example includes a movement step of moving a base to which a robot arm is coupled toward an input target position, and a detection step of detecting a difference between a stop position of the base after the movement of the base is completed and the target position. At the movement step, a set target position where the base should stop according to information on a difference detected in the past is set.

DESCRIPTION OF EXEMPLARY EMBODIMENTS

As below, a robot system and control method according to the present disclosure will be explained in detail based on preferred embodiments shown in the accompanying drawings.

First Embodiment

Figure 1:
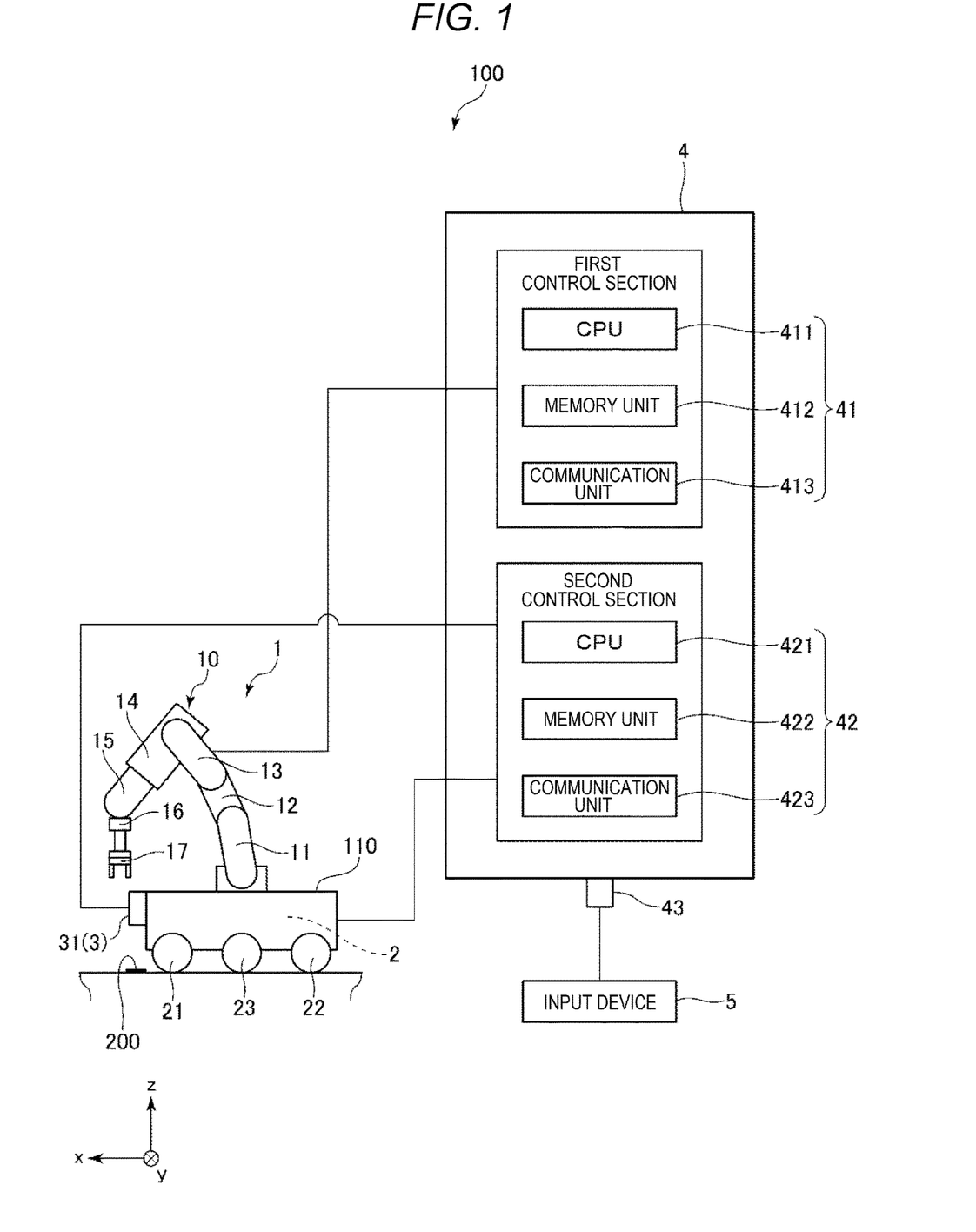
FIG. 1 is a functional block diagram showing a robot system according to a first embodiment.
Figure 2:
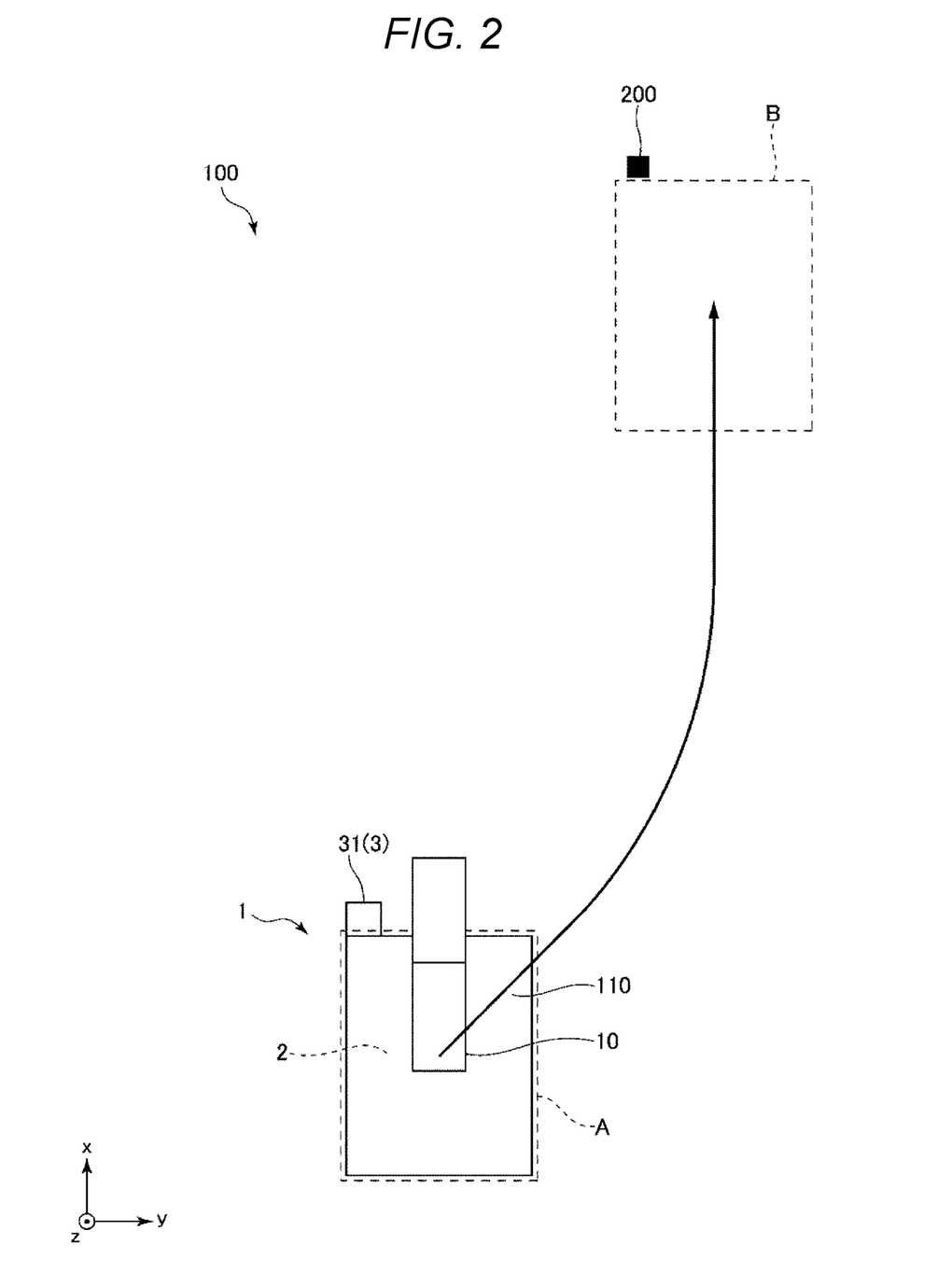
FIG. 2 is a diagram for explanation of a movement path of the robot shown in FIG. 1 as seen from vertically above.
Figure 3:
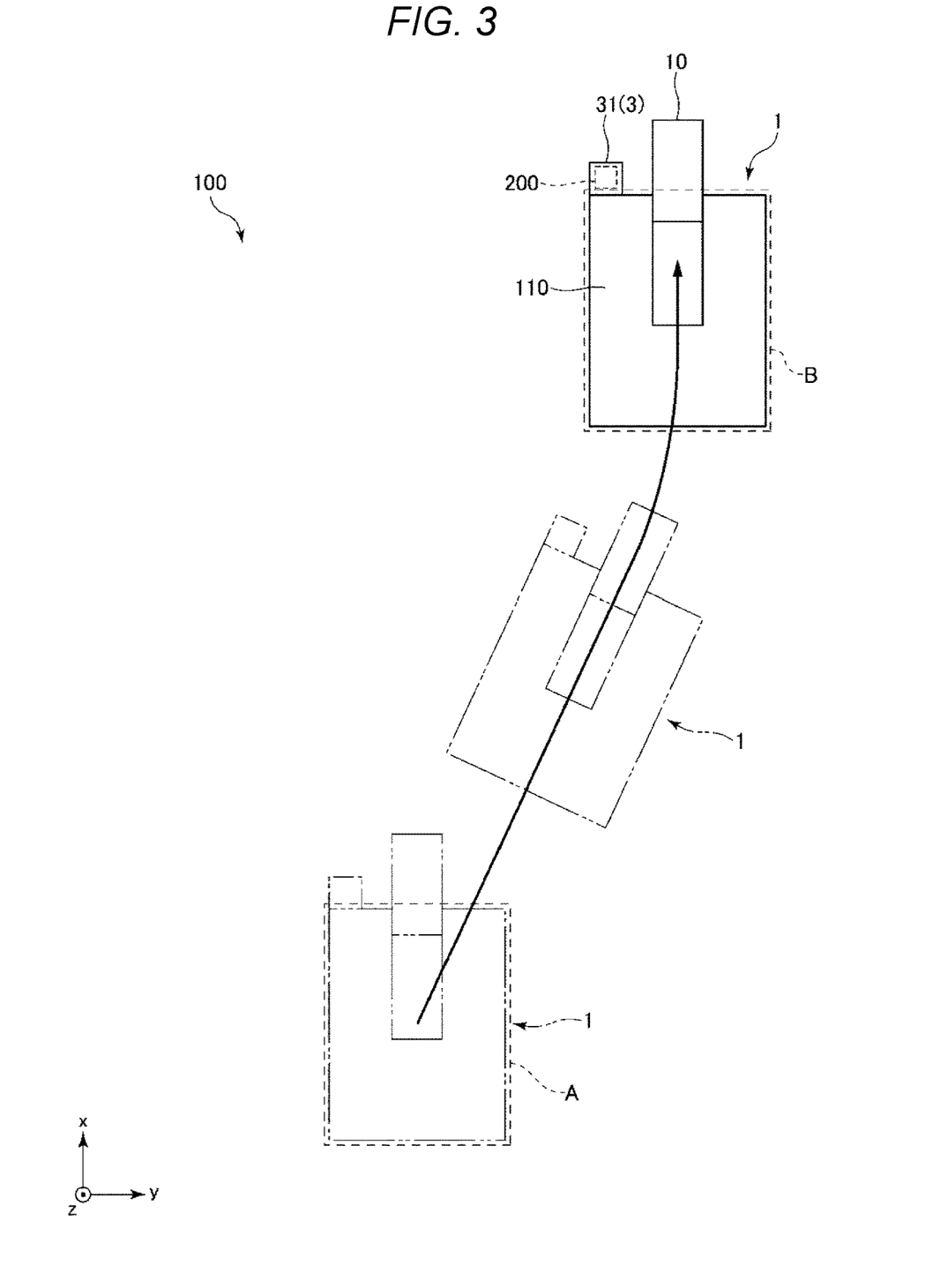
FIG. 3 is a diagram for explanation of a movement path of the robot shown in FIG. 1 as seen from vertically above.
Figure 4:
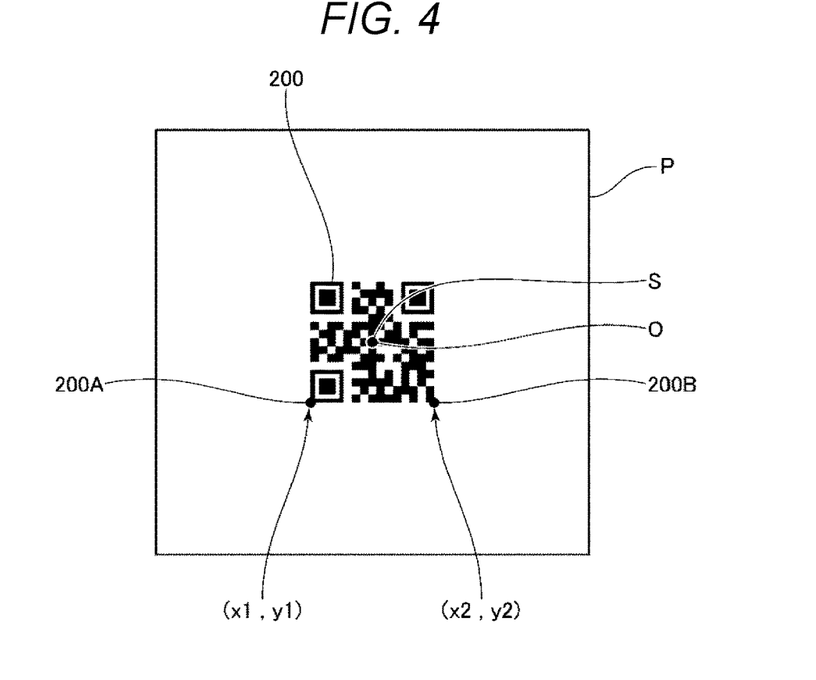
FIG. 4 is a captured image of a marker imaged by an imaging unit as a detection unit shown in FIG. 1.
Figure 5:
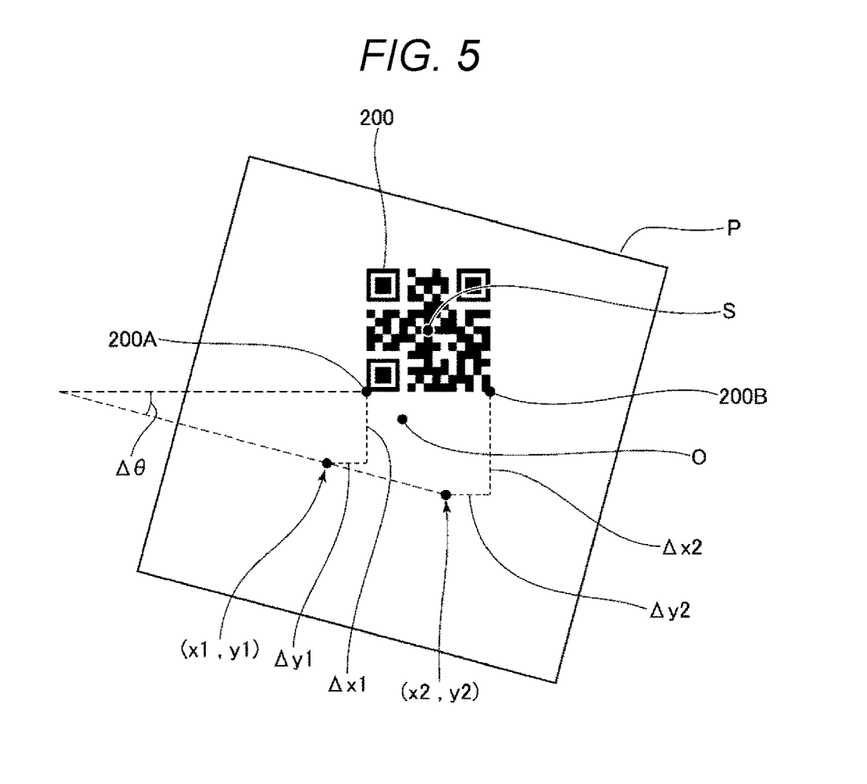
FIG. 5 is a captured image of a marker imaged by the imaging unit as the detection unit shown in FIG. 1.
Figure 6:
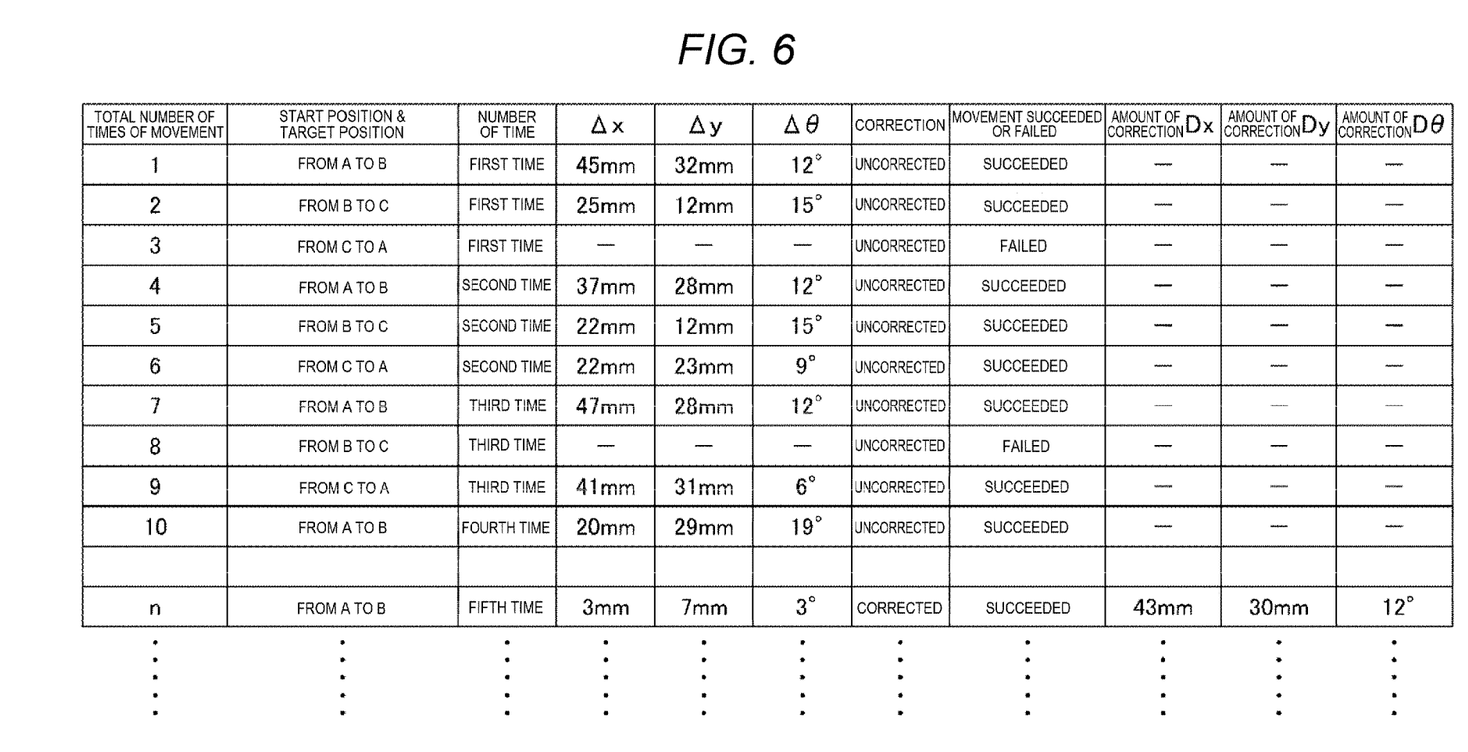
FIG. 6 is a table showing information on differences stored in a memory unit of a control apparatus shown in FIG. 1.
Figure 7:
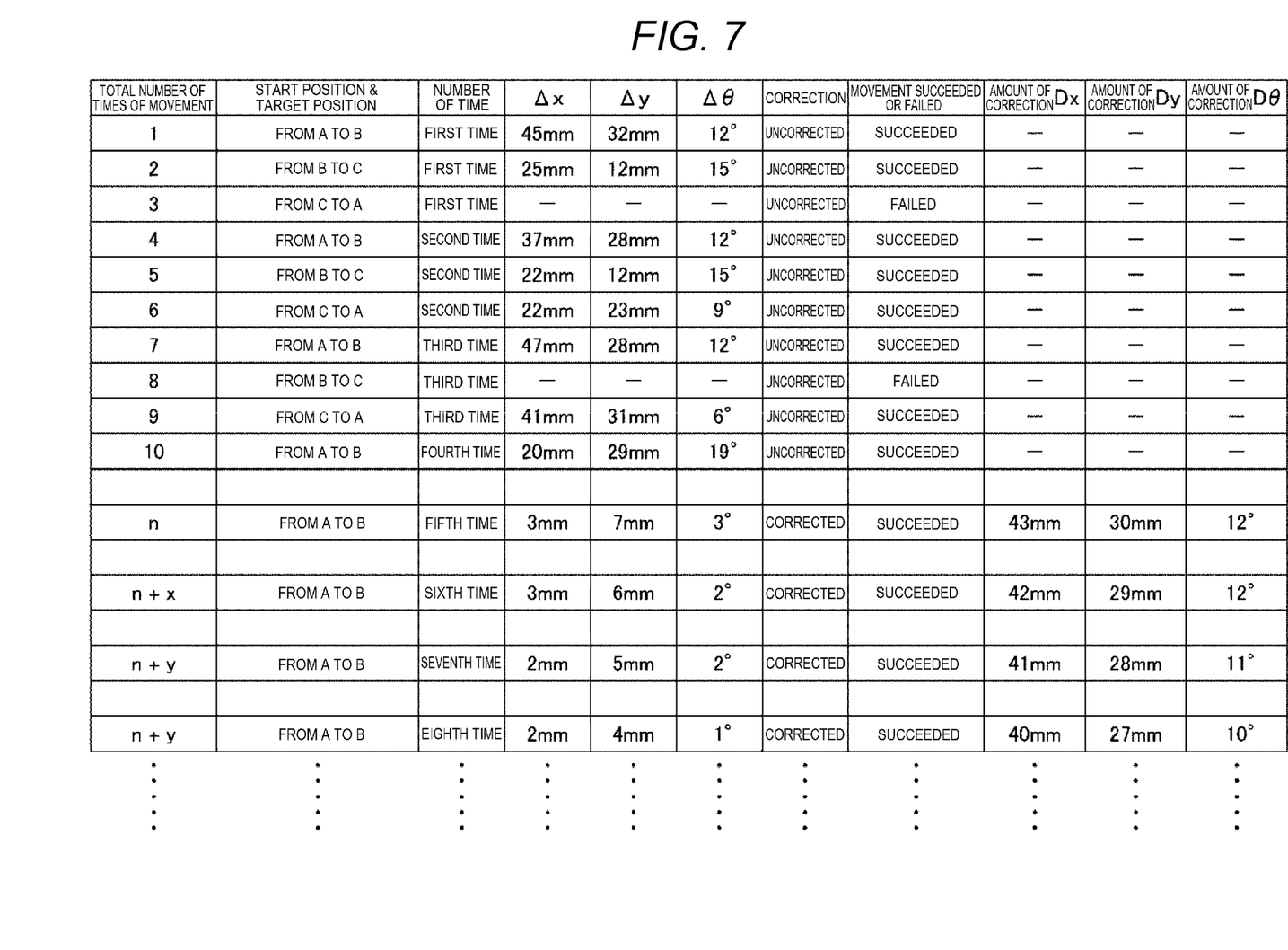
FIG. 7 is a table showing information on differences stored in the memory unit of the control apparatus shown in FIG. 1.
Figure 8:
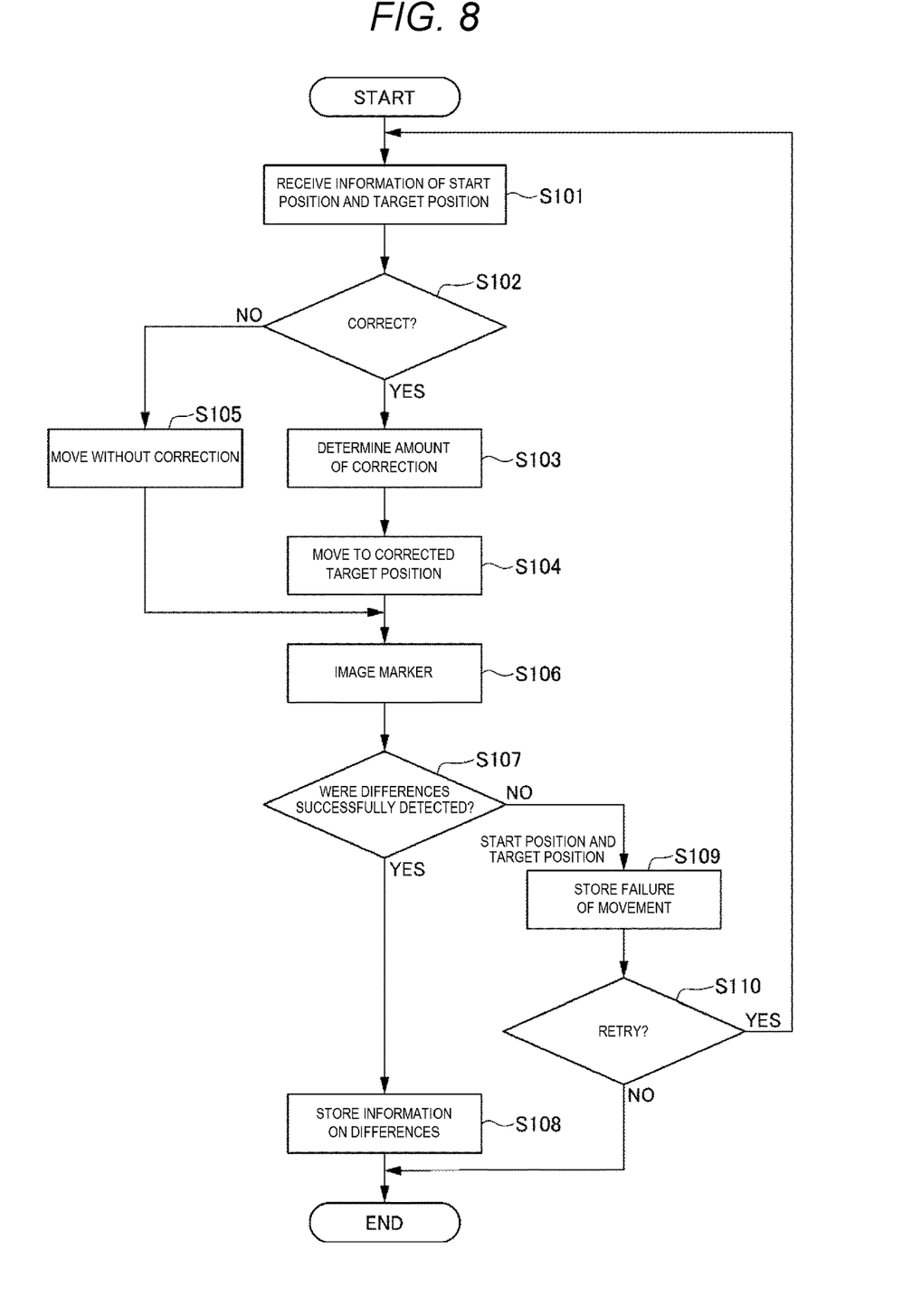
FIG. 8 is a flowchart for explanation of control operation performed by the control apparatus shown in FIG. 1.

FIG. 1 is the functional block diagram showing the robot system according to the first embodiment. FIG. 2 is the diagram for explanation of the movement path of the robot shown in FIG. 1 as seen from vertically above. FIG. 3 is the diagram for explanation of the movement path of the robot shown in FIG. 1 as seen from vertically above. FIGS. 4 and 5 are captured images of the marker imaged by the imaging unit as the detection unit shown in FIG. 1. FIGS. 6 and 7 are tables showing information on differences stored in the memory unit of the control apparatus shown in FIG. 1. FIG. 8 is the flowchart for explanation of control operation performed by the control apparatus shown in FIG. 1.

In FIGS. 1 and 3, for convenience of explanation, an x-axis, a y-axis, and a z-axis are shown as three axes orthogonal to one another. Hereinafter, directions parallel to the x-axis are also referred to as "x-directions", directions parallel to the y-axis are also referred to as "y-directions", and directions parallel to the z-axis are also referred to as "z-directions".

Hereinafter, for convenience of explanation, the +z-axis direction in FIG. 1, i.e., the upside is also referred to as "upper" or "above" and the—z-axis direction, i.e., the downside is also referred to as "lower" or "below". Further, the z-axis directions in FIG. 1, i.e., upward and downward directions are referred to as "vertical directions" and the x-directions and the y-directions, i.e., leftward and rightward directions are referred to as "horizontal directions".

A robot system 100 shown in FIG. 1 is an apparatus used for work of e.g. holding, transport, assembly, inspection, etc. of works including electronic components and electronic apparatuses. The robot system 100 includes a robot 1 having abase 110 and a robot arm 10, a movement mechanism 2 that moves the base 110, a detection unit 3, and a control apparatus 4. Further, the movement mechanism 2, the detection unit 3, and the control apparatus 4 are explained as not being contained in the robot 1 in the embodiment, however, at least one of the elements may be contained in the robot 1. That is, the movement mechanism 2, the detection unit 3, and the control apparatus 4 may be component elements of the robot 1 or not.

The robot 1 shown in FIG. 1 is the so-called six-axis vertical articulated robot and has the base 110 and the robot arm 10 coupled to the base 110.

The base 110 supports the robot arm 10. The base 110 has a housing and, inside of the housing, e.g. a drive device that drives the robot arm 10, a communication unit (not shown) for communication with the control apparatus 4, etc. are placed. Further, the origin of the robot coordinate system is set in an arbitrary position e.g. the center of gravity of the base 110. The origin is a control point of the movement by the movement mechanism 2, which will be described later.

Note that the base 110 is not limited to that shape as shown in the drawing, but may be formed by e.g. a plate-like member and a plurality of legs as long as the base has the function of supporting the robot arm 10.

The robot arm 10 shown in FIG. 1 is coupled to the base 110 at the proximal end thereof and includes an arm 11, an arm 12, an arm 13, an arm 14, an arm 15, and an arm 16 as a plurality of arms. These arm 11 to arm 16 are sequentially coupled from the proximal end toward the distal end. The respective arm 11 to arm 16 are pivotable relative to the adjacent arms or base 110.

The robot 1 has a drive device that pivots the arm 11 relative to the base 110, a drive device that pivots the arm 12 relative to the arm 11, a drive device that pivots the arm 13 relative to the arm 12, a drive device that pivots the arm 14 relative to the arm 13, a drive device that pivots the arm 15 relative to the arm 14, a drive device that pivots the arm 16 relative to the arm 15 (the drive devices are not shown). The respective drive devices include motors, controllers that control driving of the motors, and encoders that detect amounts of rotation of the motors, and are controlled by the control apparatus 4 independently from one another.

As shown in FIG. 1, an end effector 17 holding a work object is attached to the distal end of the robot arm 10. In the illustrated example, the end effector 17 grips the work object by bringing a plurality of e.g. two fingers closer to each other or separating from each other. Note that the end effector 17 is not limited to the configuration, but may be a tool such as a suction hand, magnetic hand, or drill.

Next, the movement mechanism 2 will be explained.

The movement mechanism 2 is configured by an autonomous traveling system and moves the base 110 according to a command from the control apparatus 4. The movement mechanism 2 has a plurality of wheels, i.e., a pair of front wheels 21 arranged in the y-axis directions in FIG. 1, a pair of rear wheels 22 arranged in the y-axis directions in FIG. 1, and a pair of drive wheels 23 arranged in the y-axis directions in FIG. 1. The pair of drive wheels 23 are provided between the pair of front wheels 21 and the pair of rear wheels 22. The respective drive wheels 23 are coupled to drive motors (not shown), rotated by drive forces from the drive motors, and move the base 110. Note that the pair of front wheels 21 and the pair of rear wheels 22 are driven wheels in the embodiment.

The respective drive wheels 23 are respectively independently coupled to the drive motors and respectively configured to be rotatable forward and backward. Accordingly, the mechanism moves straight forward and backward. At least ones of the rotation speeds and the rotation directions of the respective drive wheels 23 are adjusted, and thereby, the mechanism may be steered to change the traveling direction or the like. Further, in the embodiment, the front wheels 21, the rear wheels 22, and the drive wheels 23 are configured not to rotate about the z-axis. However, at least ones of the front wheels 21, the rear wheels 22, and the drive wheels 23 may be configured to rotate about the z-axis. In this case, the mechanism may be steered by adjustment of the amounts of rotation about the z-axis.

Note that "move" in this specification includes not only "move straight", "curve", "meander", and "reciprocate" but also "rotate". The number of wheels of the movement mechanism 2 is not particularly limited. The configuration of the movement mechanism 2 is not limited to the above described wheeled type, but maybe e.g. a configuration walking with a plurality of legs or the like.

In the embodiment, the movement mechanism 2 is provided inside of the base 110, however, not limited to that in the present disclosure. For example, the movement mechanism 2 may be a running vehicle and the base 110 may be placed on the running vehicle, or the running vehicle may tow the base 110.

Next, the detection unit 3 will be explained.

The detection unit 3 shown in FIG. 1 is placed in the anterior end portion in the traveling direction of the base 110, i.e., the end portion at the side of the area where the robot 1 performs work. The detection unit 3 has a function of detecting a marker 200. Here, the marker 200 indicates a target position when the base 110 is moved by the movement mechanism 2. The marker 200 is attached to a floor, i.e., a traveling surface. In the embodiment, as shown in FIGS. 4 and 5, the marker 200 includes a QR code (registered trademark). As the target position, a position set by a user as a position where the robot 1, the movement mechanism 2, the robot system 100, and the base 110 should stop after traveling is assumed. Further, hereinafter, a position where a second control section 42 controls the movement mechanism 2 and the robot 1, the movement mechanism 2, the robot system 100, and the base 110 move toward the target position and stop is referred to as "stop position". In this regard, as will be described later, the ideal condition is that the target position and the stop position coincide, however, it is assumed that the target position and the stop position are different. Further, a position set by the second control section 42 as a position where the robot 1, the movement mechanism 2, the robot system 100, and the base 110 should stop after traveling is referred to as "set target position". In other words, the set target position is a position reset by the second control section 42 by correction of the target position set by the user.

Note that the marker 200 is attached to the traveling surface in the illustrated configuration, however, may be attached to e.g. a protrusion provided on the floor, a wall, a ceiling, or the like. Alternatively, the marker 200 is not limited to the illustrated configuration, but may include a colored portion having a different color from the surrounding color, a light emitting portion, a laser point marker, a projection portion such as a projector. In this case, the shape and the color are not particularly limited.

The detection unit 3 includes an imaging unit 31 that images the marker 200. As the imaging unit 31, a 2D camera that can acquire a two-dimensional image such as a color image, black-and-white image, spectroscopic image, or infrared image may be used. Further, a camera coordinate system is set for the imaging unit 31, and the camera coordinate system is calibrated to the above described robot coordinate system. Accordingly, specific coordinates in the captured images as shown in FIGS. 4 and 5 may be interpreted in the robot coordinate system.

As described above, the imaging unit 31 is provided in the anterior end portion in the traveling direction of the base 110, and an optical axis O thereof is provided along the z-axis directions. Further, the imaging unit 31 is placed to face vertically downward.

The detection unit 3 is configured to communicate with the control apparatus 4. Accordingly, the unit may receive an imaging command signal from the control apparatus 4 and transmit the captured image to the control apparatus 4. Note that the connection between the detection unit 3 and the control apparatus 4 may be not only wired connection but also wireless connection, or connection by communication via a network such as the Internet.

As described above, the marker 200 is attached to the target position. Further, the detection unit 3 has the imaging unit 31 that images the marker. Thereby, as will be described later, the difference between the target position and the stop position may be accurately detected based on the acquired captured image.

Note that the imaging unit 31 may be placed in a different position from the above described placement position. For example, the unit may be placed in another part of the base 110, an arbitrary position of the robot arm 10, another position than that of the robot 1 e.g. vertically above the marker 200 or around the marker 200.

The detection unit 3 is the imaging unit 31 in the illustrated configuration, however, not limited to that. The detection unit 3 is appropriately selected in combination with the configuration of the marker 200 and may be e.g. an optical sensor, force sensor, capacitance sensor, magnetic sensor, or the like. When the force sensor is used, a contact portion may be set in the target position and contact between the contact portion and an arbitrary portion of the robot 1 may be detected.

Next, the control apparatus 4 will be explained.

The control apparatus 4 has a first control section 41 that controls actuation of the robot arm 10 and the second control section 42 that controls actuation of the movement mechanism 2 and the detection unit 3.

The first control section 41 controls the actuation of the robot arm 10 and has a CPU (Central Processing Unit) 411, a memory unit 412, and a communication unit 413.

The CPU 411 reads and executes various programs etc. stored in the memory unit 412. The command signal generated in the CPU 411 is transmitted to the robot 1 via the communication unit 413. Thereby, the robot arm 10 may execute predetermined work.

The memory unit 412 stores the various programs that can be executed by the CPU 411 etc. The memory unit 412 includes e.g. a volatile memory such as a RAM (Random Access Memory), a nonvolatile memory such as a ROM (Read Only Memory), and a detachable external memory device. The connection between the memory unit 412 and the first control section 41 may be not only wired connection but also wireless connection, or connection by communication via a network such as the Internet.

The communication unit 413 respectively transmits and receives signals between the robot 1, the second control section 42, and an input unit 43 using an external interface such as wired LAN (Local Area Network) or wireless LAN.

The second control section 42 controls the actuation of the movement mechanism 2 and the detection unit 3 and has a CPU 421 as a control unit, a memory unit 422, and a communication unit 423.

The CPU 421 reads and executes various programs etc. stored in the memory unit 422. Thereby, the CPU may set the set target position as the position where the robot 1, the movement mechanism 2, the robot system 100, and the base 110 should stop after traveling according to the input target position, calculate the traveling path, and moves the base 110 in the traveling path. Further, when the movement is completed, the unit drives the detection unit 3 and acquires the captured image. Thereby, the difference between the target position and the stop position may be known based on the captured image. Therefore, the unit may accurately set the target position by performing control, which will be described later, based on the information on the difference.

The memory unit 422 stores the various programs that can be executed by the CPU 421 etc. The memory unit 422 includes e.g. a volatile memory such as a RAM (Random Access Memory), a nonvolatile memory such as a ROM (Read Only Memory), and a detachable external memory device. Further, information as shown in FIG. 6 is stored in the memory unit 422. This will be described later.

The communication unit 423 respectively transmits and receives signals between the movement mechanism 2, the detection unit 3, the first control section 41, and the input unit 43 using an external interface such as wired LAN (Local Area Network) or wireless LAN.

Note that, in the embodiment, the second control section 42 controls the actuation of the movement mechanism 2 and the detection unit 3, however, the present disclosure is not limited to that. For example, a dedicated control section that controls the actuation of the movement mechanism 2 and a dedicated control section that controls the actuation of the detection unit 3 may be respectively provided.

Further, in the embodiment, the first control section 41 controls the actuation of the robot arm 10 and the second control section 42 controls the actuation of the movement mechanism 2 and the detection unit 3, however, the present disclosure is not limited to that. A single control section serves as both the first control section 41 and the second control section 42. That is, the single control section may control the actuation of the robot arm 10, the movement mechanism 2, and the detection unit 3.

Apart or all of the configuration part of the control apparatus 4 may be placed within the base 110 of the robot 1, a part or all thereof may be placed outside of the base 110, or a part or all thereof may be placed in a remote location via a network such as the Internet.

Further, the control apparatus 4 has a terminal to which a command from an input device 5 is input, i.e., an input port. This part functions as the input unit 43 to which various kinds of information including the start position and target position for movement of the robot 1 is input.

The input device 5 is a device for various settings in the control apparatus 4 by the user inputting information. The input device 5 is not particularly limited, but includes e.g. a tablet, personal computer, and smartphone. The coupling between the input device 5 and the first control section 41 is not only wired connection but also wireless connection, or connection by communication via a network such as the Internet.

As above, the configuration of the robot system 100 is explained.

In the robot system 100, the user inputs the current position of the robot 1, i.e., the start position and the target position using the input device 5, and thereby, the information is stored in the memory unit 422 of the second control section 42. For example, as shown in FIGS. 2 and 3, when the input start position is a position A and the input target position is a position B, the CPU 421 calculates the traveling path from the position A to the position B based on the information using the program stored in the memory unit 422. Then, the CPU controls the actuation of the movement mechanism 2 using the calculated traveling path and, as shown in FIG. 3, moves the base 110 to the position B and stops the base.

Note that the current position and the start position may be different.

Further, the start position and the target position are respectively selected from among the position A, the position B, and a position C and stored as names of locations, i.e., the position A to the position C as shown in FIG. 6 in the memory unit 422. Note that the start position and the target position may be respectively input as coordinates of the control points in the robot coordinate system.

To the position A to the position C, the markers 200 indicating these positions are attached. When the robot arrives at these position A to position C, the detection unit 3 reaches the position where the unit can detect the markers 200. That is, the position relationship between the position of the detection unit 3 after the arrival and the marker 200 is set in advance. For example, the robot arrives at the target position and the stop position coincides with the target position, the marker 200 is located immediately below the imaging unit 31. That is, in the ideal condition after arrival, the optical axis O of the imaging unit 31 and a center S of the marker 200 may be set to coincide.

The marker 200 is the QR code as described above, and the direction of the marker 200 and the position of the corner portion are specified from the pattern of the code. Note that information carried by the QR code may be read or not. As below, a case where the information carried by the QR code is not read, but the QR code is used as a marker will be explained.

Then, when the robot 1 moves toward the target position and stops, that is, is in the stop position, the CPU 421 of the second control section 42 acquires a captured image P by imaging the marker 200 using the imaging unit 31. The captured image P shown in FIG. 4 is an image in the ideal condition, i.e., a condition with no difference between the target position and the stop position. In this condition, the position of the marker 200 appearing in the captured image P is located in a reference position in the captured image P.

In the embodiment, the CPU 421 determines whether or not an ideal condition is obtained with reference to two corner portion 200A and corner portion 200B of the marker 200. The CPU 421 calculates an amount of mismatch, i.e., differences with respect to each of the x-axis directions and the y-axis directions between coordinates of the corner portion 200A in the camera coordinate system and reference coordinates (x1, y1) stored in advance, and calculates differences with respect to each of the x-axis directions and the y-axis directions between coordinates of the corner portion 200B in the camera coordinate system and reference coordinates (x2, y2) stored in advance. In the ideal condition, these differences are zero.

Note that the reference for specification of the position is not limited to that using the corner portion 200A and the corner portion 200B in the captured image P, but may be e.g. a reference using corner portions in diagonal locations.

On the other hand, as shown in FIG. 5, the target position and the stop position may be different. For this, there may be various factors including a condition of the traveling surface and a condition of wheels. When the target position and the stop position are different, the differences between the coordinates of the corner portion 200A in the camera coordinate system and the reference coordinates (x1, y1) and the differences between the coordinates of the corner portion 200B in the camera coordinate system and the reference coordinates (x2,y2) are calculated with respect to each of the x-axis directions and the y-axis directions.

Note that, hereinafter, the difference in the x-axis directions relative to the reference coordinates (x1, y1) of the corner portion 200A is $\Delta x1$ and the difference in the y-axis directions is $\Delta y1$, and the difference in the x-axis directions relative to the reference coordinates (x2,y2) of the corner portion 200B is $\Delta x2$ and the difference in the y-axis directions is $\Delta y2$.

The difference $\Delta x1$, the difference $\Delta y1$, the difference $\Delta x2$, and the difference $\Delta y2$ are respectively calculated. Then, $(\Delta x1+\Delta x2)/2$ is calculated and the value is used as a difference $\Delta x$ in the x-axis directions between the target position and the stop position, and $(\Delta y1+\Delta y2)/2$ is calculated and the value is used as a difference $\Delta y$ in the y-axis directions between the target position and the stop position.

Further, the CPU 421 calculates a difference about the z-axis, i.e., an amount of mismatch in the rotation direction in addition to the calculation of the difference $\Delta x$ and the difference $\Delta y$. This calculation is performed by obtaining an angle formed by a straight line passing through the reference coordinates (x1,y1) and the reference coordinates (x2,y2) and a straight line passing through the corner portion 200A and the corner portion 200B. This value is used as a difference $\Delta \theta$.

Note that $\Delta x1$, $\Delta x2$, $\Delta y1$, $\Delta y2$, $\Delta x$, $\Delta y$, and $\Delta \theta$ are respectively positive numerical values, negative numerical values, or zero.

As described above, the CPU 421 calculates the difference $\Delta x$, the difference $\Delta y$, and the difference $\Delta \theta$, and stores these values, i.e., information on the differences in the memory unit 422. Note that the method of calculating the difference $\Delta x$, the difference $\Delta y$, and the difference $\Delta \theta$ is not limited to the above described method.

When the robot 1 performs work after the movement by the movement mechanism 2 is completed, the control of the robot arm 10 may be performed with consideration of the difference $\Delta x$, the difference $\Delta y$, and the difference $\Delta \theta$. Alternatively, the robot may be returned to the start position again and moved toward the target position again with consideration of the difference $\Delta x$, the difference $\Delta y$, and the difference $\Delta \theta$.

The movement of the robot 1 from the start position to the target position is repeated when work is performed. Particularly, when the robot 1 is repeatedly used in the same location, e.g., within a factory or the like, the above described movement is repeated. That is, the start position and the target position are not so much varied, and there are often several combinations of the positions. In this case, the difference $\Delta x$, the difference $\Delta y$, and the difference $\Delta \theta$ between the start position and the target position may be reduced as quickly as possible and the accuracy of the movement to the target position may be increased under the following control.

In the robot system 100, as shown in FIG. 6, the differences between the start position and the target position are detected at each time when the robot moves from the start position to the target position, stores information on the detected differences, and accumulates data. As below, the explanation will be made by taking a specific example.

FIG. 6 is the table showing information on differences stored in the memory unit of the control apparatus shown in FIG. 1. In the table, "rows" extend in the leftward and rightward directions and "columns" extend in the upward and downward directions. For example, in the table, the uppermost row shows items and shows the names of the items of the information shown in the columns, i.e., in the lower parts. The uppermost row shows "total number of times of movement", "start position & target position", "number of time", "Δx", "Δy", "Δθ", "with or without correction", "movement succeeded or failed", and "amount of correction" sequentially from the left side.

"Total number of times of movement" refers to a total of the number of times of movement from the start position toward the target position regardless of where the start position and the target position are. In the column of "total number of times of movement", numerals are shown sequentially from one.

"Start position & target position" is an item respectively showing the start position and the target position, and combinations of twos of A to C are shown e.g. "from B to C".

"Number of time" refers to a number of time with respect to each combination of the start position and the target position. For example, "from A to B" is described at the fourth time of the total number of times of movement, however, the robot actually moves "from A to B" at the second time and "number of time" is the second time.

"Δx", "Δy", and "Δθ" are as described above.

"With or without correction" shows whether or not correction was performed. This correction will be described later.

"Movement succeeded or failed" shows whether or not the movement succeeded or failed. Whether or not the movement succeeded or failed is determined based on whether or not the entire of the marker 200 appears in the captured image imaged by the imaging unit 31. That is, when detection of "Δx", "Δy", and "Δθ" was successful, the movement is regarded as being succeeded and, when the detection is failed, the movement is regarded as being failed because the differences are too large.

"Amount of correction" refers to an amount of correction before traveling to the target position. In the embodiment, the second control section 42 sets a target set position in which coordinates of the input target position and the posture at arrival are corrected as positions where the robot 1, the movement mechanism 2, the robot system 100, and the base 110 should stop after traveling. Note that the amount of correction is expressed by numerical values showing the degrees of correction of the reference coordinates (x1, y1) and the reference coordinates (x2,y2) of the target position. In the illustrated configuration, the amount of correction of the x-axis coordinates of the reference coordinates (x1,y1) and the reference coordinates (x2,y2) is expressed by Dx and the amount of correction of the y-axis coordinates is expressed by Dy. Further, the amount of correction of the posture at arrival is expressed by Dθ.

Note that Dx, Dy, and Dθ are respectively positive numerical values or negative numerical values.

As described above, in the robot system 100, "total number of times of movement", "start position & target position", "number of time", "Δx", "Δy", "Δθ", "with or without correction", "movement succeeded or failed", and "amount of correction" as the information on the differences are associated with one another and stored in the memory unit 422 of the control apparatus 4. Further, as the total number of times of movement increases, the latest information is stored in the lowermost row and the information is accumulated.

As described above, the information on the differences between the start position and the target position contains the amount of correction of the correction of the target position. Thereby, for example, as will be described later, the set target position may be set based on the amount of correction in the past. Therefore, the set target position may be set more accurately.

In the embodiment, the target position is corrected in the following manner, that is, the set target position is set based on the information. Specifically, for example, with a focus on the combination of the start position and the target position "from A to B", correction is not performed until the number of time of movement is the fourth time, i.e., the total number of times of movement is ten, and the set target position is set based on the differences Δx, the differences Δy, and the differences Δθ of the first to fourth times of the number of times of movement "from A to B" at the fifth time of the number of time of movement "from A to B". In other words, the amount of correction of the target position at the fifth movement is calculated based on the tendencies of the differences Γx, the differences Γy, and the differences Δθ in the movement "from A to B" at the four times in the past and the set target position is set using the amount of correction. For example, an average value of the differences Δx at the four times, an average value of the differences Δy at the four times, and an average value of the differences Δθ at the four times are calculated and the set target position with the reference coordinates (x1,y1) and the reference coordinates (x2,y2) of the target position corrected to cancel out these differences is set. Thereby, the tendencies in the past may be taken into consideration for the amount of correction, and the more accurate amount of correction may be calculated. Therefore, the fifth time of movement "from A to B" may be accurately performed.

As described above, the CPU 421 as the control unit sets the set target position based on the information on the differences when the number of times at which the information on the differences between the target position and the stop position is stored reaches a predetermined number of times, in the embodiment, four. Thereby, the more accurate amount of correction may be calculated and the movement to be made may be accurately performed.

Note that, in the embodiment, the predetermined number of times is four, however, may be one to three, five, or more.

The correction is first performed at the fifth time of the time of movement "from A to B" as the combination of the start position and the target position, however, in the embodiment, at the sixth or subsequent times of movement "from A to B", the correction may be performed at each time. In this case, the set target position may be set at the sixth time of movement "from A to B" using the amount of correction at the fifth time of movement "from A to B".

That is, when setting the set target position, the CPU 421 as the control unit sets the set target position using the amount of correction already stored in the memory unit 422. Thereby, the step of calculating the amount of correction may be omitted and the target position may be accurately corrected by the simpler control.

Or, as shown in FIG. 7, the information on the movement "from A to B" is accumulated at a plurality of times e.g.

seven times, the set target position may be set at the eighth time of movement "from A to B" in the following manner.

At the eighth time of movement "from A to B", data of correction at the three times in the past is accumulated. That is, in the movement "from A to B" at the fifth to seventh times, data of the respective amounts of correction is stored. The CPU 421 selects a combination of the minimum amounts of correction of combinations of these amounts of correction Dx, Dy, Dθ, and sets the set target position at the eighth time of movement "from A to B" with the amounts of correction Dx, Dy, Dθ. Specifically, in the seventh movement "from A to B", the amounts of correction Dx, Dy, Dθ are respectively the minimum values, and the target position is corrected using the amounts of correction Dx, Dy, Dθ at the seventh time.

As described above, when the CPU 421 as the control unit sets the set target position, when a plurality of the combinations of the amounts of correction Dx, Dy, Dθ were already stored in the memory unit 422, the combination of the minimum amounts of correction Dx, Dy, Dθ of the respective amounts of correction Dx, Dy, Dθ is used. Thereby, setting of the set target position with excessively corrected target position and increase of the differences between the target position and the stop position may be prevented, and correction may be performed so that the differences between the target position and the stop position may be smaller more accurately.

When the CPU 421 as the control unit corrects the set target position, when a plurality of the combinations of the amounts of correction Dx, Dy, Dθ were already stored in the memory unit 422, the amounts of correction Dx, Dy, Dθ stored at the last time may be used. For example, at the eighth time of movement "from A to B", the amounts of correction Dx, Dy, Dθ corrected at the movement immediately before, i.e., the seventh time of movement "from A to B" may be used. According to the control, the set target position may be set using the amounts of correction Dx, Dy, Dθ corrected at the movement when the condition is close to the current traveling surface condition and close to the current wheel condition of the movement mechanism 2. Therefore, the correction may be performed so that the differences between the target position and the stop position may be smaller more accurately.

Or, when the CPU 421 sets the set target position, when a plurality of combinations of the amounts of correction Dx, Dy, Dθ were already stored in the memory unit 422, a standard deviation of the respective amounts of correction Dx, a standard deviation of the respective amounts of correction Dy, and a standard deviation of the respective amounts of correction Dθ may be calculated and the set target position with the corrected target position may be set using these values. Thereby, the tendencies in the past may be reflected on the amounts of correction and the more accurate correction may be performed.

As described above, the robot system 100 includes the base 110, the robot arm 10 coupled to the base 110, the movement mechanism 2 that moves the base 110, the input unit 43 to which the target position of the base 110 is input, the CPU 421 as the control unit that controls the actuation of the movement mechanism 2 based on the target position input to the input unit 43, the detection unit 3 that detects the differences between the stop position of the base 110 after the movement of the base 110 by the movement mechanism 2 is completed and the target position, and the memory unit 422 that stores the information on the differences detected by the detection unit 3. Then, when moving the base 110, the CPU 421 sets the set target position where the base 110 should stop according to the information already stored in the memory unit 422. Thereby, the differences between the stop position where the base 110 is moved and stopped and the target position may be reduced as quickly as possible and the accuracy of the movement to the target position may be increased.

Further, when the amounts of correction Dx, Dy, Dθ are respectively equal to or larger than the reference values, the CPU 421 as the control unit may correct the target position at the next time of movement and, when the amounts of correction Dx, Dy, Dθ are smaller than the reference values, may perform control to set the set target position without correction of the target position at the next time of movement.

Next, control performed by the control apparatus 4, i.e., the control method according to the present disclosure will be explained using the flowchart shown in FIG. 8.

First, the user inputs the start position and the target position of the robot 1 using the input device 5. Then, at step S101, the information on the start position and the target position is received.

Then, at step S102, whether or not the correction of the target position is performed is determined. The determination may be made based on e.g. whether or not the number of times at which the information on the differences between the target position and the stop position was stored reached the predetermined number of times as described above.

At step S102, when the number of times reached the predetermined number of times, at step S103, the amounts of correction Dx, the amounts of correction Dy, and the amounts of correction Dθ are determined. For example, as described above, the determination is made by selection of the minimum values, average values, standard deviations, or the like of the amounts of correction Dx, Dy, Dθ. Then, at step S104, the robot moves to the corrected target position, i.e., the set set target position.

Then, when the robot arrives at the target position and stops, at step S106, the marker 200 is imaged by the imaging unit 31.

Note that, when a determination that the correction is not performed is made at step S102, at step S105, the robot moves to the set target position set without the correction of the target position, and the process moves to step S106.

Then, at step S107, in the captured image imaged at step S106, whether or not the difference Δx, the difference Δy, and the difference Δθ were successfully detected is determined. At step S107, when a determination that the difference Δx, the difference Δy, and the difference Δθ were successfully detected is made, at step S108, the information on the differences is stored. Note that the information on the differences contains "total number of times of movement", "start position & target position", "number of time", "Δx", "Δy", "Δθ", "with or without correction", "movement succeeded or failed", and "amount of correction" as shown in FIGS. 6 and 7.

Or, at step S107, when a determination that the differences were not successfully detected, that is, not the whole marker 200 appears in the captured image is made, at step S109, a failure of the movement is stored. Note that, at the step, as shown in FIGS. 6 and 7, the items of "total number of times of movement", "start position & target position", "number of time", "with or without correction", and "movement succeeded or failed" are stored.

Then, at step S110, whether or not a retry is performed is determined. For example, when the user instructs a retry using the input device 5, the robot returns to the start position and moves again. Note that, at step S110, when a determination that a retry is not performed is made, the program is ended.

As described above, the control method according to the present disclosure includes a movement step of moving the base 110 to which the robot arm 10 is coupled toward the input target position, and a detection step of detecting the differences between the stop position of the base 110 after the movement of the base 110 is completed and the target position. Further, at the movement step, the set target position where the base 110 should stop is set according to the information on the differences detected in the past. Thereby, the differences between the stop position where the base 110 is moved and stopped and the target position may be reduced as quickly as possible and the accuracy of the movement to the target position may be increased.

Second Embodiment

Figure 9:
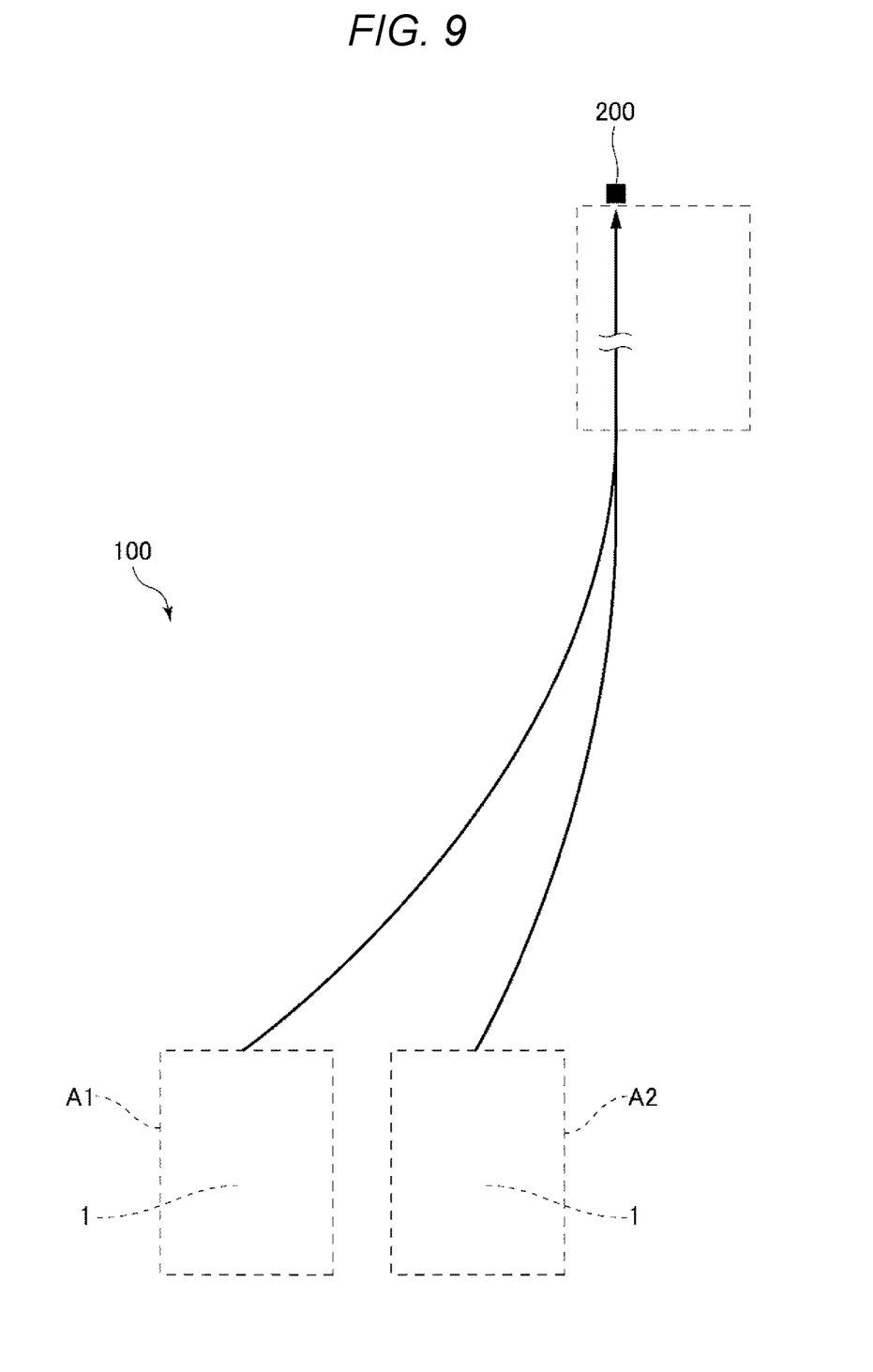
FIG. 9 is a diagram for explanation of a control method of a robot system according to a second embodiment in which a robot and around thereof are seen from vertically above.

FIG. 9 is the diagram for explanation of the control method of the robot system according to the second embodiment in which the robot and around thereof are seen from vertically above.

As below, the second embodiment of the robot system and control method according to the present disclosure will be explained with reference to FIG. 9, and the explanation will be made with a focus on differences from the above described embodiment and the explanation of the same items will be omitted.

FIG. 9 shows a case where the robot 1 is located in a position A1 and a case where the robot 1 is located in a position A2 different from the position A1. Further, the distance between the position A1 and the position A2 is sufficiently small relative to the distance to the marker 200. Furthermore, in either case, the target position is the same position.

In the embodiment, a case where the robot 1 is moved toward the target position from the position A1 as the start position and a case where the robot 1 is moved toward the target position from the position A2 as the start position are regarded as taking the same traveling path and use the same amount of correction. That is, for example, when the robot is moved from the position A1 toward the target position, when information on the differences when the robot was moved from the position A2 toward the same target position in the past is stored, the set target position with the target position corrected according to the information is set. Thereby, for example, even in a movement path for the first time, the target position may be corrected and the set target position may be set with information when the robot moved in the traveling path passing through a position nearby. Further, the number of samples for calculation of the amounts of correction increases and the set target position may be set even more accurately.

Third Embodiment

Figure 10:
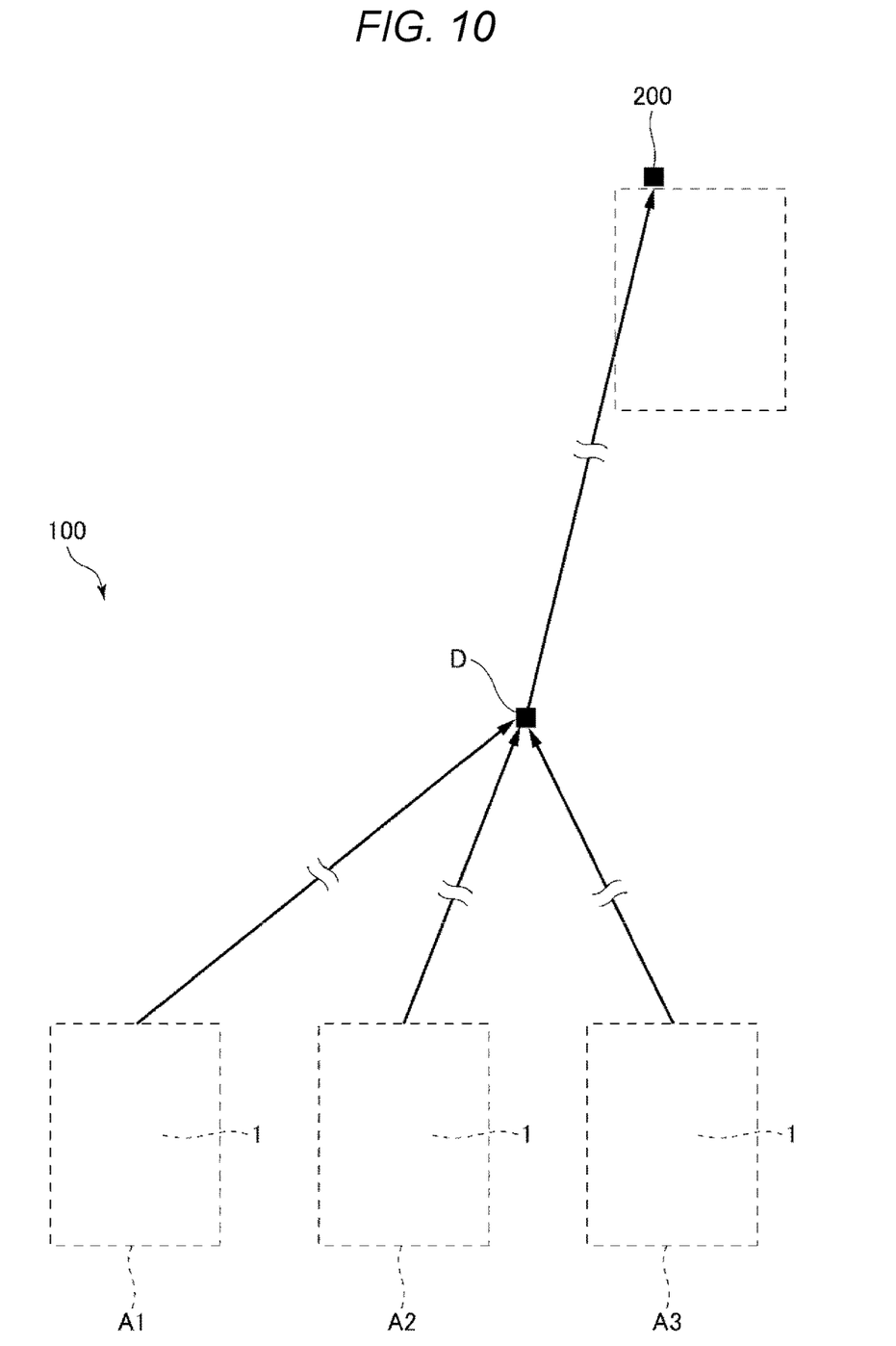
FIG. 10 is a diagram for explanation of a control method of a robot system according to a third embodiment in which a robot and around thereof are seen from vertically above.

FIG. 10 is the diagram for explanation of the control method of the robot system according to the third embodiment in which the robot and around thereof are seen from vertically above.

As below, the third embodiment of the robot system and control method according to the present disclosure will be explained with reference to FIG. 10, and the explanation will be made with a focus on differences from the above described embodiments and the explanation of the same items will be omitted.

FIG. 10 shows a case where the robot 1 is located in the position A1, a case where the robot 1 is located in the position A2, and a case where the robot 1 is located in a position A3. The position A1, the position A2, and the position A3 are different positions from one another. In a case where the robot 1 is moved toward the target position from the position A1 as the start position, a case where the robot 1 is moved toward the target position from the position A2 as the start position, and a case where the robot 1 is moved toward the target position from the position A3 as the start position, the respective traveling paths are the same after via a location D.

In this case, in addition to the items of the tables described in the above described embodiment, coordinates of the location D and the via location D are stored. That is, information on the differences in the embodiment further contains information on the via location.

Then, in the embodiment, when the robot 1 is moved toward the target position, when the robot travels via the location D, the traveling paths are regarded as being the same and the same amount of correction is used. That is, for example, when the robot is moved from the position A1 via the location D to the target position, when information on the differences when the robot was moved from the position A2 or the position A3 via the location D to the same target position in the past is stored, the set target position with the target position corrected according to the information is set. Thereby, for example, even in a movement path for the first time, the set target position with the corrected target position may be set with information when the robot moved in the traveling path passing the same via location. Further, the number of samples for calculation of the amounts of correction increases and the set target position may be set even more accurately.

Note that the via locations are not necessarily the same. That is, the x-coordinates and the y-coordinates of the via locations are stored in a wide range, and thereby, the traveling paths passing through the region may be regarded as passing through the same via location.

As above, the robot system and control method according to the present disclosure are explained based on the illustrated embodiments, however, the present disclosure is not limited to those. The configurations of the respective parts may be replaced by arbitrary configurations having the same functions. Further, another arbitrary configuration may be added to the present disclosure. The robot systems according to the above described embodiments are the systems including the six-axis vertical articulated robots, however, the number of axes of the vertical articulated robot may be five or less, seven, or more. Alternatively, a horizontal articulated robot may be used in place of the vertical articulated robot.

What is claimed is:

1. A robot system comprising:
   three axes orthogonal to each other being defined as an X axis, a Y axis, and a Z axis;
   a movable robot having a movable robot base;
   a robot arm of the movable robot, the robot arm being coupled to the movable robot base;
   a movement mechanism configured to move the moveable robot base;
   a marker disposed at an external environment of the movable robot,
   an input interface to which a target position of the movable robot base is input, the target position having a target coordinate and a target rotation of the marker at the external environment, the target coordinate corresponding to the target X value on the X axis and a target Y value on the Y axis of the marker at the external environment, the target rotation corresponding to a target rotation value around the Z axis of the marker at the external environment;

a camera configured to capture the marker;

a memory configured to store a program; and a processor configured to execute the program so as to:
set the movable robot base at an initial position;
receive the target position via the input interface;
cause the movable robot base to move to a stop position from the initial position according to the target position so that the movable robot base stops at the stop position;
cause the camera to capture the marker to generate a captured image while the movable robot base is at the stop position;
calculate a stop coordinate and a stop rotation of the marker of the captured image, the stop coordinate corresponding to a stop X value on the X axis and a stop Y value on the Y axis of the marker of the captured image, the stop rotation corresponding to a stop rotation value around the Z axis of the marker of the captured image;
calculate differences between the target X value and the stop X value, between the target Y value and the stop Y value, and between the target rotation value and the stop rotation value;
store the differences into the memory;
repeat the setting of the movable robot base, the receiving of the target position, the moving of the movable robot base, the causing of the camera to capture, the calculating of the stop coordinate and the stop rotation, the calculating of the differences, and the storing of the differences;
create a set target position based on the differences that are stored into the memory due to the repeating, the set target position having a set target coordinate and a set target rotation of the marker at the external environment, the set target coordinate corresponding to a set target X value on the X axis and a set target Y value on the Y axis of the marker at the external environment, the set target rotation corresponding to a set target rotation value around the Z axis of the marker at the external environment; and
operate the movable robot based on the set target position.

2. The robot system according to claim 1, wherein when a number of the repeating reaches a predetermined number, the processor is configured to create the set target position.

3. The robot system according to claim 1, wherein the processor is configured to create the set target position based on a minimum value of the differences.

4. The robot system according to claim 1, wherein the processor is configured to create the set target position based on lastly stored differences of the differences, and the lastly stored differences are lastly stored into the memory.

5. A control method of a movable robot having a movable robot based and a robot arm for causing a processor to execute a program stored in a memory, the method comprising executing on the processor the steps of:

defining three axes orthogonal to each other as an X axis, a Y axis, and a Z axis,
setting the movable robot base at an initial position;
receiving a target position of the movable robot base via an input interface, the target position having a target coordinate and a target rotation of a marker disposed at an external environment of the movable robot, the target coordinate corresponding to a target X value on the X axis and a target Y value on the Y axis of the marker at the external environment, the target rotation corresponding to a target rotation value around the Z axis of the marker at the external environment;
causing the movable robot base to move to a stop position from the initial position according to the target position so that the movable robot base stops at the stop position;
causing the camera to capture the marker to generate a captured image while the movable robot base is at the stop position;
calculating a stop coordinate and a stop rotation of the marker of the captured image, the stop coordinate corresponding to a stop X value on the X axis and a stop Y value on the Y axis of the marker of the captured image, the stop rotation corresponding to a stop rotation value around the Z axis of the marker of the captured image;
calculating differences between the target X value and the stop X value, between the target Y value and the stop Y value, and between the target rotation value and the stop rotation value;
storing the differences into the memory;
repeating the setting of the movable robot base, the receiving of the target position, the moving of the movable robot base, the causing of the camera to capture, the calculating of the stop coordinate and the stop rotation, the calculating of the differences, and the storing of the differences;
creating a set target position based on the differences that are stored into the memory due to the repeating, the set target position having a set target coordinate and a set target rotation of the marker at the external environment, the set target coordinate corresponding to a set target X value on the X axis and a set target Y value on the Y axis of the marker at the external environment, the set target rotation corresponding to a set target rotation value around the Z axis of the marker at the external environment; and
operating the movable robot based on the set target position.

6. The control method according to claim 5, wherein when a number of the repeating reaches a predetermined number, the processor is configured to create the set target position.

7. The control method according to claim 5, wherein the processor is configured to create the set target position based on a minimum value of the differences.

8. The control method according to claim 5, wherein the processor is configured to create the set target position based on lastly stored differences of the differences, and the lastly stored differences are lastly stored into the memory.

* * * * *